W. C. & K. H. LOK.
AUTOMOBILE SIGNAL.
APPLICATION FILED JAN. 12, 1917.
1,270,633.
Patented June 25, 1918.
2 SHEETS—SHEET 1.
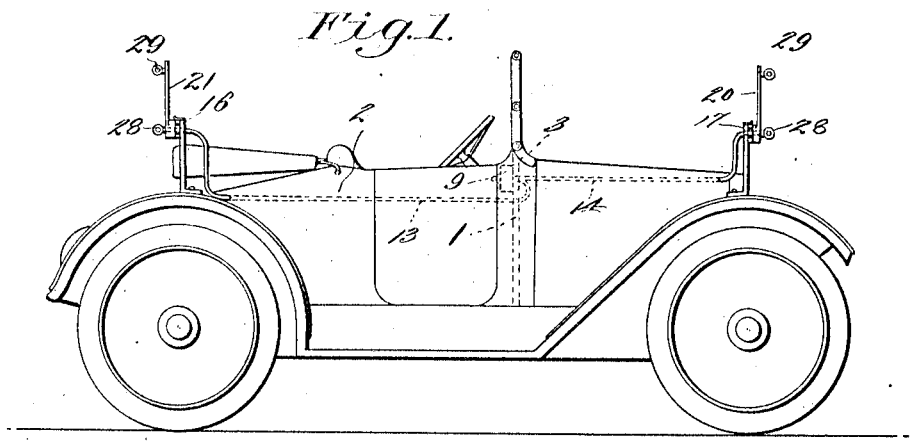
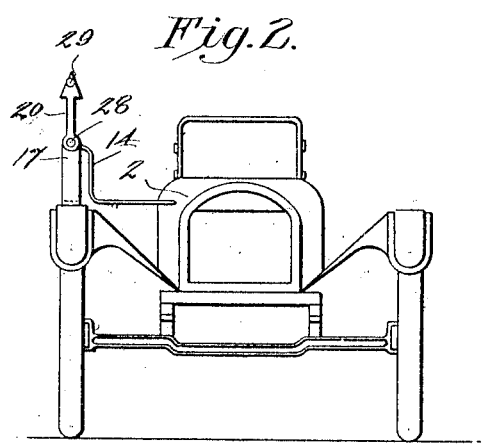
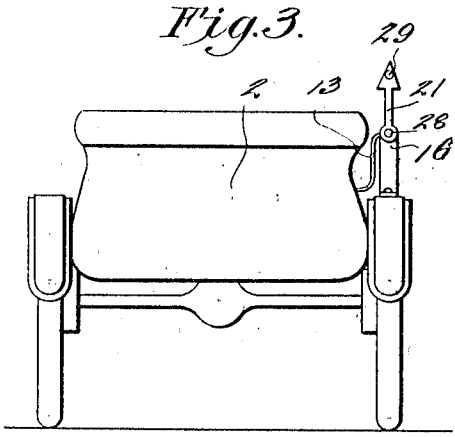
WITNESSES
INVENTORS
W. C. Lok and
K. H. Lok,
BY Victor J. Evans
ATTORNEY

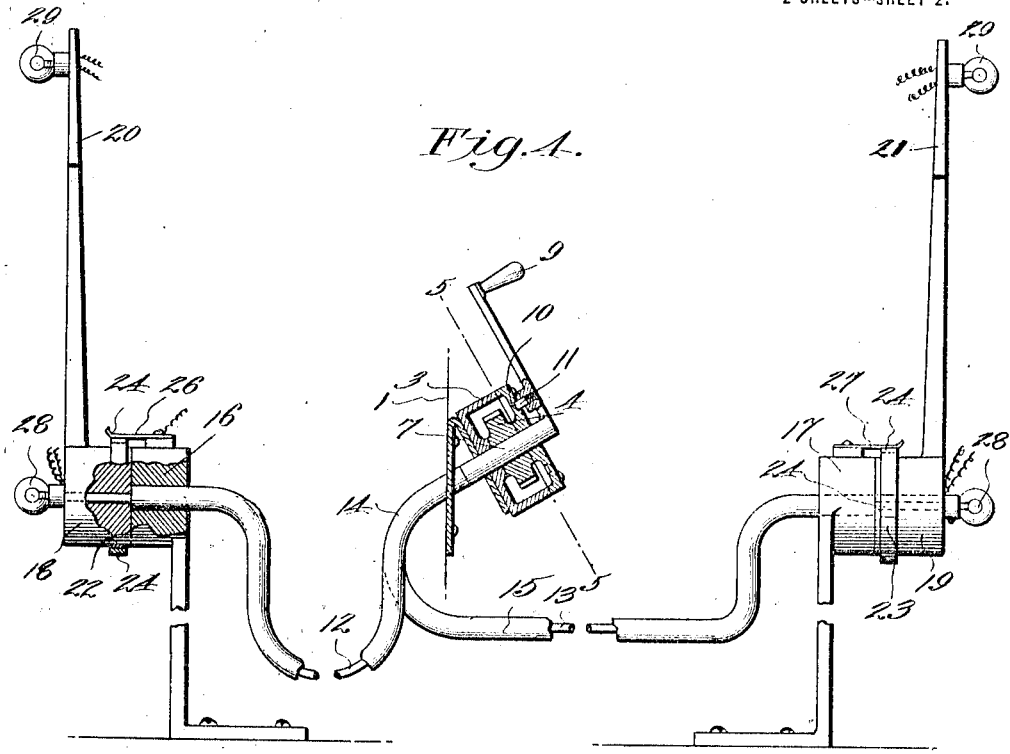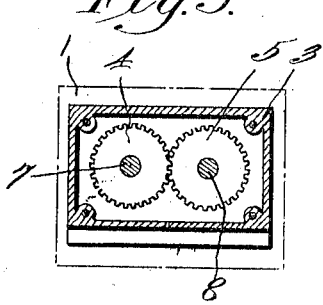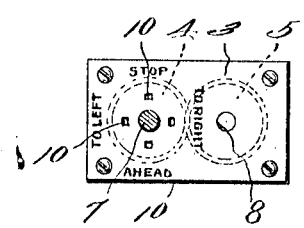

UNITED STATES PATENT OFFICE.

WALTER C. LOK AND KARL H. LOK, OF TOLEDO, OHIO.

AUTOMOBILE-SIGNAL.

1,270,633. Specification of Letters Patent. Patented June 25, 1918.

Application filed January 12, 1917. Serial No. 142,095.

*To all whom it may concern:*

Be it known that we, WALTER C. LOK and KARL H. LOK, citizens of the United States, residing at Toledo, in the county of Lucas and State of Ohio, have invented new and useful Improvements in Automobile-Signals, of which the following is a specification.

This invention relates to improvements in signaling apparatus for automobiles and similar vehicles, and has for its object to arrange a signal arm upon both the front and rear of the vehicle, which arms are actuated by simple mechanism under the control of the driver, whereby to simultaneously swing both of the said arms to indicate the direction of travel of the vehicle.

It is a further object of the invention to produce a signal apparatus including arms arranged at the front and rear of the vehicle and operated by a crank or like device in close proximity to the driver of the vehicle, the said arms having lamps arranged thereon that are in electric circuit with the battery of the vehicle and which, when the arms are swung to indicate that the vehicle is to be turned either to the right or to the left or that the said vehicle is to be halted, will be lighted so as to signal to both the front and rear of the vehicle just what course the vehicle is to pursue, and whereby persons to the front and rear of the said vehicle may be readily warned either in the daylight or in the night time of the direction of travel of the vehicle.

We obtain the foregoing results and others by the simple construction and arrangement of parts such as is disclosed by the accompanying drawings, in which:

Figure 1 is a side elevation of a vehicle provided with our improvement,

Fig. 2 is a front elevation of the same,

Fig. 3 is a rear elevation of the same.

Fig. 4 is a sectional view,

Fig. 5 is a transverse sectional view approximately on the line 5—5 of Fig. 4, and Fig. 6 is a front elevation of the casing containing the actuating mechanism which is arranged upon the dashboard or at any other convenient position upon the vehicle with respect to the driver.

Upon the dashboard 1 or at any other suitable or desired location with respect to the driver of the vehicle 2, we arrange a casing 3. Within this casing is journaled two intermeshing toothed wheels 4 and 5 respectively. The shafts 7 and 8 of the respective wheels 4 and 5 are journaled in suitable bearings in the front and rear plates of the casing, both of the shafts extending through the said rear plates, and the shafts 7 for the toothed wheel 4 also projecting through the front plate of said casing and receiving a removable crank or handle 9. Upon the front plate of the said casing is suitable indicia, such as the word "Stop" which is arranged at the upper central portion of the casing, the word "Ahead" which is arranged at the lower central portion of the casing, the inscription "To right" arranged centrally at the right hand side of the casing and the inscription "To left" arranged upon the left hand side of the casing and diametrically opposite the inscription "To right." Preferably at the referred to points the casing is provided with depressions 10 and the crank 9 is also preferably provided with a spring detent 11 which is adapted to engage in any one of the said depressions to hold the handle at a desired position with respect to the casing. The detent may, of course, be in the nature of a spring dog, but preferably the frictional engagement by the detent with the said depressions is sufficient to retain the handle in proper position and to also permit of the said handle being actuated without necessitating separate mechanism for operating the detent.

The shafts 8 and 9 each have one of their ends projecting through one side of the casing, from what may be termed the inner face or plate thereof, and connected to the said ends of the said shafts are flexible shafts 12 and 13 respectively, the same being arranged in suitable flexible tubings 14 and 15 respectively, and these tubes are connected to the central portion of the bracket members 16 and 17 which are arranged respectively upon the front and rear of the vehicle 2. Thus it will be noted that the flexible shafts 12 and 13 each extend from one of the sides of the casing 3, the shaft 12 being projected outwardly or toward the front of the vehicle, but the shaft 13 is bent upon itself or otherwise rounded and continued rearwardly to the back of the machine. By this arrangement the turning of the crank 9 permits of both of the flexible shafts being turned in the same direction, so that the indicating means connected with the said shafts and hereinafter to be fully described, will, upon the actuation of the handle member 9, turn simultaneously in the same direction.

Mounted for rotation upon the brackets 16 and 17 are the hubs 18 and 19 of signal arms 20 and 21 respectively, and the flexible shafts 12 and 13 are connected with the said hubs 18 and 19, whereby to revolve the said arms when the crank 9 is actuated so that the arms may be retained in a vertical downward position to indicate that the vehicle is running straight ahead; to the right or left to indicate that the vehicle is to turn in either of such directions, and a vertical upright position to indicate that the vehicle is to be brought to a stop.

The hubs 18 and 19 are surrounded by fiber or non-electric conducting rings or bands 22 and 23 respectively, and these bands, at desired intervals, have embedded therein contact plates 24—24. The plates are arranged at right angles with respect to each other. Secured to the brackets 16 and 17 and insulated therefrom are spring contact members 26 and 27 respectively which are arranged in the battery circuit of the vehicle. To the center, and upon the outer face of each of the hubs 18 and 19 is disposed a lamp 28 which is wired to each of the contact plates 24, the said lamp being preferably provided with a green or colored globe while upon the outer end of each of the arms 20 and 21 is disposed an electric bulb 29, the shade of which being preferably white, and the said bulb is wired to the respective contact plates 24. The contact plates are so arranged that when the crank is moved to turn the arm to either of its right angular positions the lamps will be lighted, the return circuit from the lamps and contacts being, if desired, grounded in the usual manner to the framework of the machine, and if desired the hubs may be provided with only three contact plates so that the lamps will not be lighted when the arms are in a position to indicate that the vehicle is traveling in a straight-ahead direction.

Having thus described the invention, what we claim is:

In a device of the character described comprising pivoted direction indicating blades at the front and rear of a vehicle, means for moving said blades to selective positions comprising a casing secured upon the vehicle, a pair of shafts journaled entirely through said casing, one of said shafts having one end prolonged, intermeshing gears secured upon said shaft within said casing, a handle secured upon said prolonged end, a spring pressed detent on the under side of said handle the adjacent wall of said casing being provided with a plurality of depressions engageable by said detent, said depressions corresponding to the positions assumed by said signal blades, a torsion shaft secured to the other end of the shaft provided with a handle, and a torsion shaft secured to the corresponding end of the first named shaft, said torsion shafts being directed one toward the front and the other toward the rear of the vehicle and secured to the pivots of said blades.

In testimony whereof we affix our signatures.

WALTER C. LOK.
KARL H. LOK.